United States Patent [19]

Osrow et al.

[11] Patent Number: 4,910,973

[45] Date of Patent: Mar. 27, 1990

[54] PORTABLE ICE CREAM MACHINE

[75] Inventors: Harold Osrow, Dix Hills; Zvi Bleier, Bellemore, both of N.Y.

[73] Assignee: NEC Corporation, Tokyo, Japan

[21] Appl. No.: 314,758

[22] PCT Filed: Mar. 31, 1988

[86] PCT No.: PCT/US88/01086

§ 371 Date: Jan. 9, 1989

§ 102(e) Date: Jan. 9, 1989

[87] PCT Pub. No.: WO88/07331

PCT Pub. Date: Oct. 6, 1988

[51] Int. Cl.$^4$ ............................................. A23G 9/12
[52] U.S. Cl. ........................................ 62/342; 366/149; 366/320; 366/324; 415/73
[58] Field of Search ................... 62/342, 343; 366/149, 366/169, 163, 320, 324; 415/73

[56] References Cited

U.S. PATENT DOCUMENTS

| | | | |
|---|---|---|---|
| 2,278,340 | 3/1942 | Weinreich et al. | 62/342 X |
| 2,577,916 | 12/1951 | Rollman | 62/125 |
| 2,587,127 | 2/1952 | Erickson et al. | 366/163 |
| 2,592,709 | 4/1952 | Kinnaird | 366/169 |
| 3,393,899 | 7/1968 | Wells | 366/324 X |
| 4,632,566 | 12/1986 | Masel et al. | 62/343 X |
| 4,669,275 | 6/1987 | Ohgushi et al. | 62/342 |
| 4,736,600 | 4/1988 | Brown | 62/342 |
| 4,796,440 | 1/1989 | Shiotani et al. | 62/343 |

Primary Examiner—William E. Tapolcai
Attorney, Agent, or Firm—Helfgott & Karas

[57] ABSTRACT

A machine for making ice cream and the like, having a receptacle for receiving liquid ingredients to be used for making the ice cream. A mixing chamber is provided which has an egress from which the ice cream exits. A cooling chamber surrounds the mixing chamber. A rotor centrally mounted in the mixing chamber atomizes and mixes the liquid ingredients and moves it through the mixing chamber to its egress. The rotor has a central post and outwardly projecting blades. A conduit feeds the liquid ingredients from the receptacle to the central post of the rotor. An outlet port on the central post is provided, through which the liquid ingredients are ejected outwardly from the central post for action by the blade means. A pull down screw arrangement helps pull down the liquid ingredients from the receptacle to the mixing chamber.

28 Claims, 8 Drawing Sheets

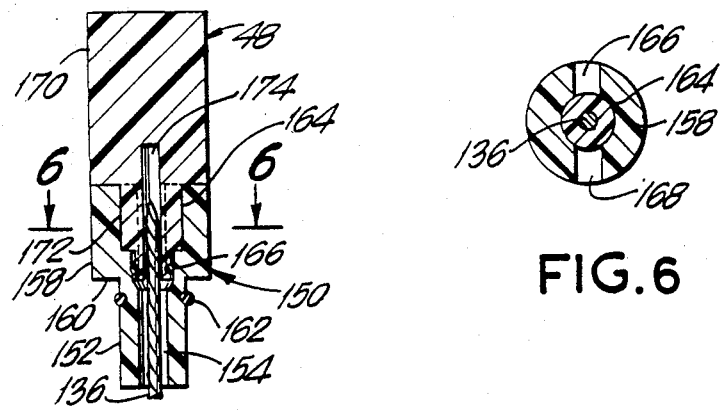
FIG.5
FIG.6
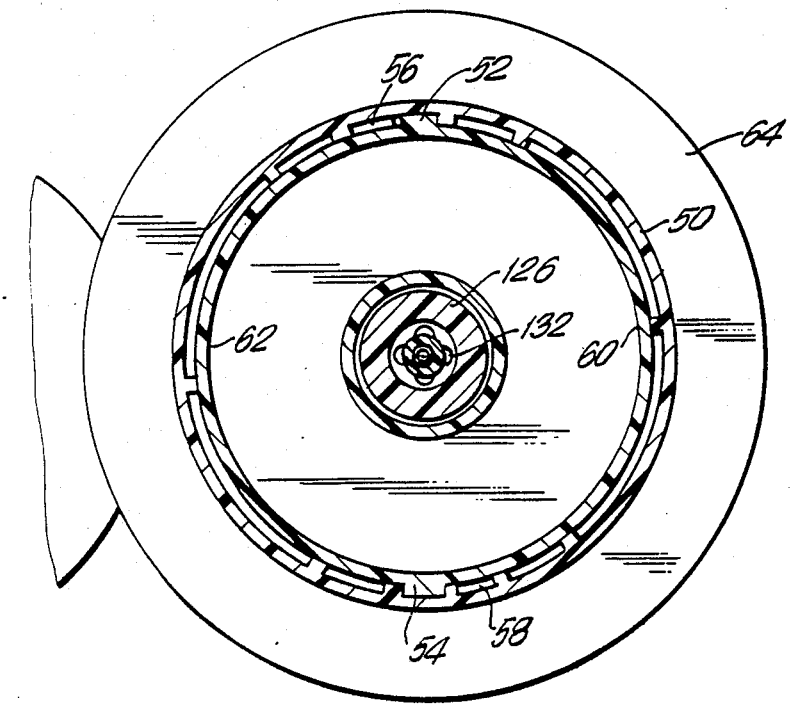
FIG.7

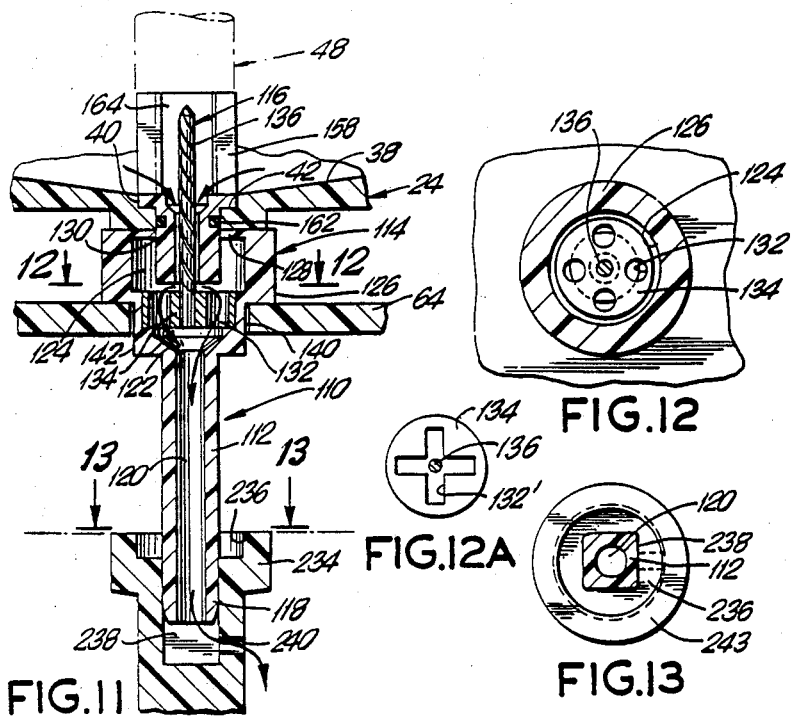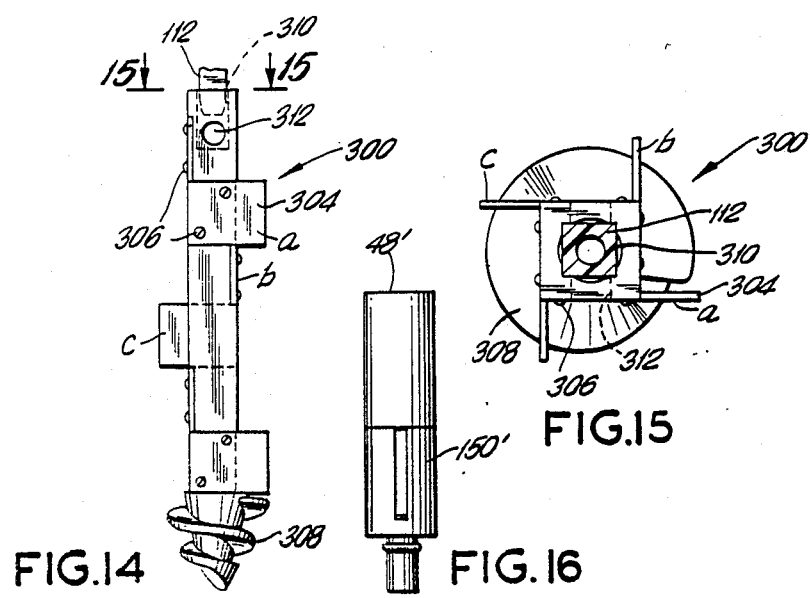

4,910,973

PORTABLE ICE CREAM MACHINE

BACKGROUND OF THE INVENTION

This invention relates to ice cream making machines, and more particularly to a portable machine for making ice cream or other frozen comestibles from liquid ingredients.

Ice cream making machines are well known and various models are available on the market. Many of the large units include internal compressors with coils through which a cooling liquid passes in order to provide adequate reduced temperatures for the formation of the ice cream. Some available machines are associated with into freezers and utilize the flow through the freezing coils of the freezer for the reduced temperatures required for making the ice cream. One such machine is described in U.S. Pat. No. 4,632,566.

Most types of ice cream making machines require special ingredients in order to form the ice cream. Such ingredients typically include a cream substance, sugar,, starches, and various other products either mixed together or purchased as a premix, and utilized in the formation of the ice cream.

One of the considerations of a useful ice cream making machine is the time required for producing the output. Many of the existing machines take a considerable amount of time from when the ingredients are inserted until the final product is produced. These machines are not desirable because of such lag in time. Another criteria for a good machine is the quality of the product. The final product must be one that is of good consistency, that is smooth, well blended, without the presence of lumpy or unwanted particles, and tasty. This aspect, namely the quality of the product, is the most important criteria for a successful ice cream making machine.

While such ice cream making machines are readily available and described in various prior art references, nevertheless none of the available device have provided an adequate quality product at sufficiently fast rate with continuous reproducable consistent results and which is easy to use, simply to assemble, and easy to clean and maintain.

It should be appreciated, that although ice cream making machines are described, the term "ice cream" is meant in a generic sense and refers to various types of frozen comestibles including ices, ice creams, ice milks, and the like.

SUMMARY OF THE INVENTION

Accordingly, it is an object of the present invention to provide an improved ice cream making machine which quickly produces a high quality product.

Yet another object of the present invention is to provide an ice cream making machine which is easy to utilize, fast in operation, easy to clean, and produces a high quality output.

Yet a further object of the present invention is to provide an ice cream making machine which produces an output from simple liquid ingredients such as fruit juices, chocolate milk, and the like.

Yet a further object of the present invention is to provide an ice cream making machine having a removable cannister which can be stored in a freezer and placed into the machine when being used.

Still a further object of the present invention is to provide a portable ice cream making machine which includes a drive shaft having multiple uses including driving a rotor for mixing the liquid ingredients, feeding the liquid ingredients to the rotor, locking the rotor in place, and facilitating removability of the parts for easy cleaning and maintenance.

A further object of the present invention is to provide an ice cream making machine where the liquid ingredient is center fed to a rotor whereby the liquid ingredient is radially dispensed outwardly toward the blades of the rotor.

Another object of the present invention is to provide and ice cream making machine which fluffs the liquid ingredients to make a high quality product.

Briefly, in accordance with the present invention, there is provided a machine for making ice cream and the like, which includes a receptacle for receiving the liquid ingredients to be used for making the ice cream. A mixing chamber is provided which includes an egress from which the ice cream exits. A cooling chamber surrounds the mixing chamber. Within the mixing chamber, a rotor is centrally mounted for atomizing and mixing the liquid ingredients and moving it through the mixing chamber to its egress. The rotor includes a central post with an outwardly projecting blade assembly. A conduit member feeds the liquid ingredients from the receptacle to the central post of the rotor. An outlet port on the central post permits the liquid ingredients to be ejected outwardly from the central post for action by the blade assembly.

In an embodiment of the invention the conduit member is in the form of a drive shaft which is received into a matingly keyed bore extending at least partially into the central post. An axial passageway through the drive shaft is used for feeding the liquid ingredients from the receptacle to the central bore from which the liquid passes out of the outlet port.

In an embodiment of the invention, a threaded screw is supported by the drive shaft and projects into the receptacle for aiding in pulling down the liquid ingredients build up from the receptacle through the drive shaft and into the mixing chamber.

The cooling chamber is provided within a portable cannister type removable cartridge. The interior of the cannister forms the mixing chamber. The cannister is removable for refreezing and is thereby available for subsequent reuse. A suitable locking mechanism retains the cannister in place in the ice cream making machine.

During the mixing of the ingredients, the rotor fluffs the liquid to thereby produce a superior product.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the drawings:

FIG. 5 is a cross-sectional view taken along lines 5—5 of FIG. 4 and showing a feed plug having a central aperture through which the pull down screw extends and with a stop plug closing off the top of the feed plug;

FIG. 6 is a cross-sectional view taken long lines 6—6 of FIG. 5;

FIG. 7 is a cross-sectional view taken along lines 7—7 of FIG. 4 and showing a neck portion of the ice making machine interconnecting the head portion with the receptacle;

FIG. 11 is a cross-sectional view taken along lines 11—11 of FIG. 4 and showing the drive shaft supporting the pull down screw with the drive shaft inserted into the bore in the rotor;

FIG. 12 is a cross-sectional view taken along lines 12—12 of FIG. 11 and showing the mouth of the drive shaft:

FIG. 12A is an alternate arrangement of the passages through the head of the drive shaft.

FIG. 13 .s a cross-sectional view taken along lines 13—13-of FIG. 11 and showing the matingly keyed interconnection between the drive shaft and the rotor;

FIG. 14 is a vertical elevational view of a rotor in accordance with another embodiment of the present invention;

FIG. 15 is cross-sectional view taken along lines 15—15 of FIG. 14 and showing the interconnection between the drive shaft and the rotor of the embodiment of FIG. 14;

FIG. 16 is a vertical elevational view of another size feed plug and stop plug combination, showing the ability to interchange sizes of the plugs in the receptacle for different consistencies of the liquid ingredients.

In the various figures of the drawing like reference characters designate like parts.

DETAILED DESCRIPTION OF THE PREFERRED EMBODIMENT

Figure 1:
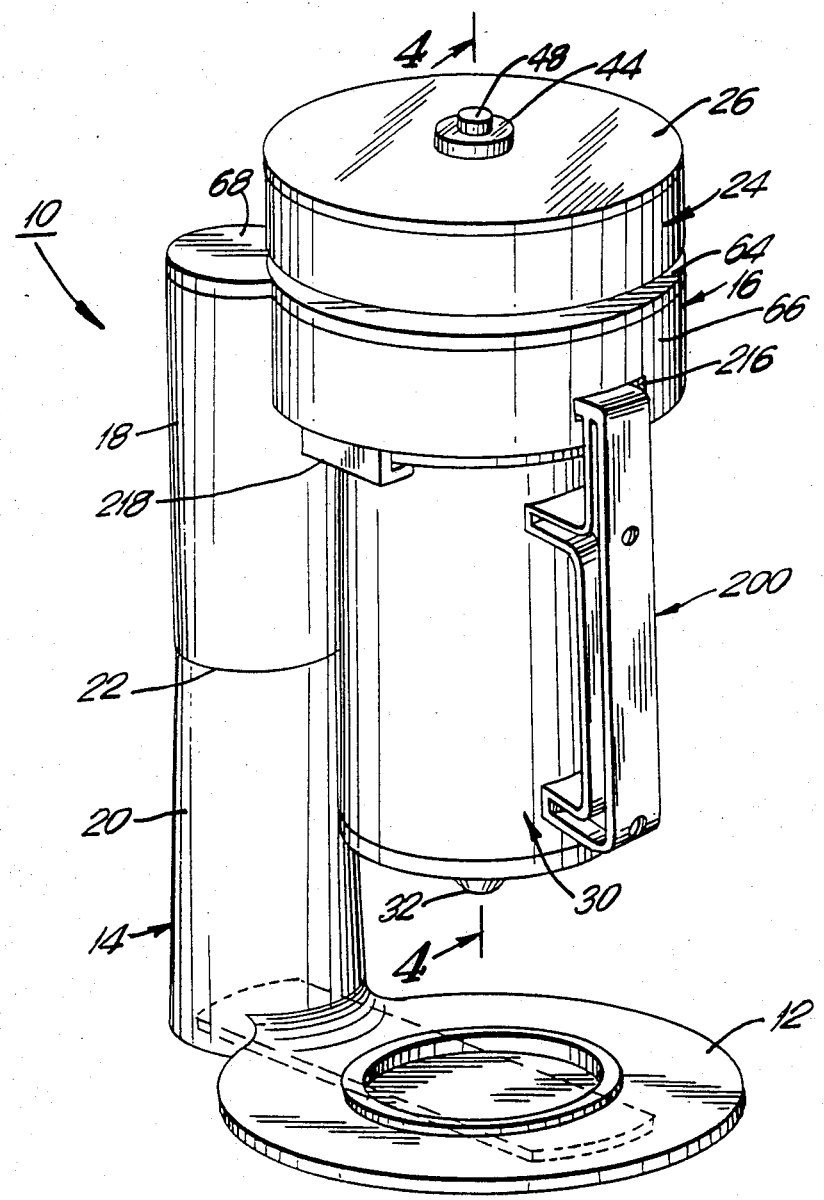
FIG. 1 is a perspective view of the assembled ice cream machine with accordance with the present invention.

Referring now to the drawings, the ice cream machine of the present invention is shown generally at 10, and is shown to include base portion 12 in the form of a flat, substantially circular plate with a metal construction support 13. A raised rim 15 is positioned on the plate. A vertical stanChion 14 extending from one end of the base 12 is supported by the base and interconnects a substantially cylindrical head portion 16 with the base portion 12. The stanchion 14 is formed of upper and lower parts 18, 20 interconnected along the junction 22.

Seated onto the head portion 16 is a receptacle 24 having a removable cover 26 and in which the liquid ingredients are placed. A removable cannister cartridge 30 is securably connected from the head portion 16 so that it depends therefrom.. At the lower end of the cannister 30 is an outlet 32 from which is emitted the resulting ice cream. It is noted that in the assembled condition, as shown in FIG. 1, the cannister has its outlet 32 spaced from the base portion 12 to permit insertion of a cup, or the like, to catch the emitted ice cream.

In operation, the cover 26 is removed, liquid ingredients are then placed into the receptacle 24. The ice cream machine is turned on whereby the liquid ingredients are feed into a mixing chamber 34 in the center of the cannister 30 and the ice cream results are emitted from the lower end 32 of the cannister.

Figure 17:
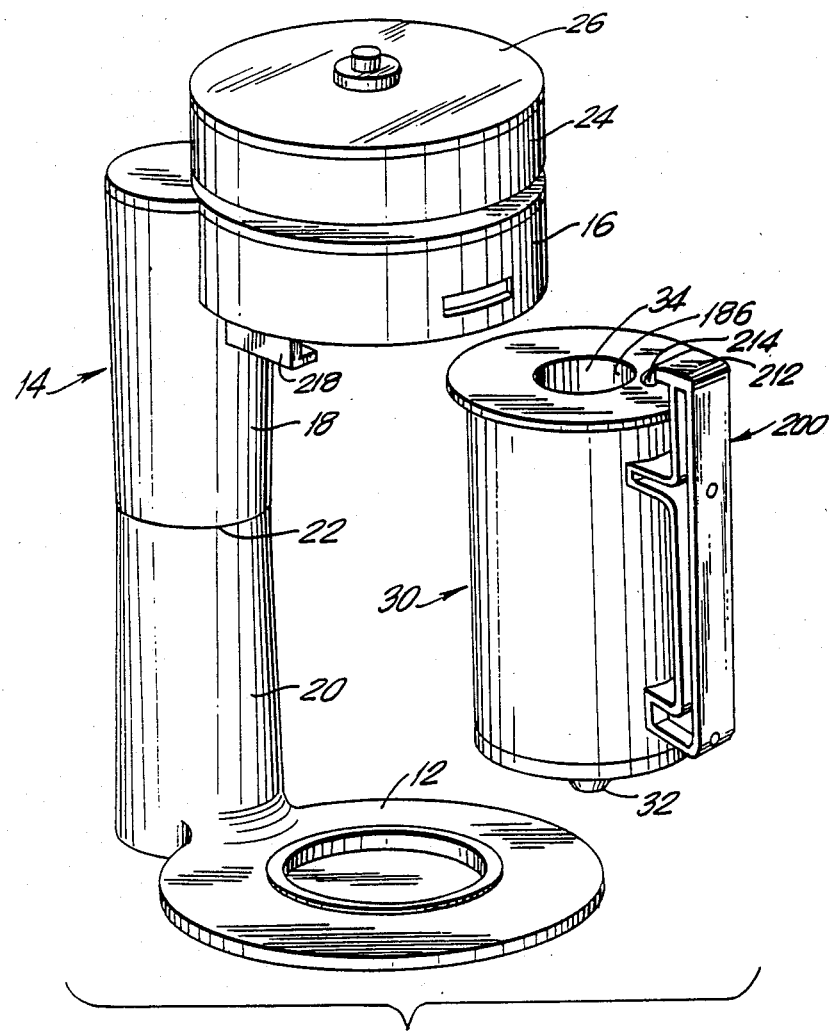
FIG. 17 is an exploded perspective view showing the removability of the cannister cartridge form the housing of the ice cream machine.

The cannister can be removed, as shown in FIG. 17, and refrozen for subsequent use whereupon it is again replaced in its position in the machine.

The receptacle 24 is a substantially cylindrical flat container having a circular peripheral outer wall 3 with a conical base wall 38 terminating in a central aperture 40. The central aperture 40 includes an annular seat 42 separating a wider upper mouth with a narrower lower neck for a purpose hereinafter to be described.

The cover 26 is a substantially flat cylindrical member having an upwardly projecting central knob 44 with a center bore 46 therein. Bore 46 is suitable for receiving a stop plug 48, as will hereinafter be described. The conical base wall aids in the flow of liquid from the base of the receptacle toward the central aperture 40 from which the liquid ingredient can flow to the mixing chamber, as will hereinafter be described.

Downwardly depending from the receptacle is a circular skirt wall 50 including a pair of diametrically opposed slots 56, 58. These slots fit over the outwardly projecting knobs 52, 54 which project outwardly from the peripheral wall 62 of the raised central hub 60.

In this manner, the receptacle can be easily inserted over the hub 60 and is appropriately seated in place be means of the knobs entering into the spaces provided therefor in the skirt portion to eat the receptacle in place.

The hub portion 60 is supported on a top plate 64 which fits over the housing head section 16 and is supported by the peripheral walls 66 about the head portion. A matingly adjacent substantially circular plate section 68 having a acrurate shaped concave edge 70 merges with the plate section 64 and covers the stanchion portion 14. Internally of the head portion 16 is a pulley wheel 72 covered by upper and lower plates 74, 76. A central hub 78 is of a type that can include ball bearings. An aperture 80 is formed in the center hub. The aperture is shown to include multiple corners and specifically eight corners 82 are formed thereon. The hub 78 of the pulley wheel 72 is supported on a circular post 84 mounted on the bottom wall 86 of the head portion 16.

A belt 88 passes around the pulley wheel 72 and extends around an adjacent drive pulley 90 provided at the upper portion of the stanchion 14. The drive pulley 90 is rotatably driven and supported by means of the motor shaft 92 upwardly extending from a motor 94 which is positioned within the stanchion 14. Wires pass down from the motor and exit through a switch 96 at the bottom of the stanchion leaving as wires 98 for energization by plugging into a house plug. The support wall 86 extends across the stanchion 14 and is retained by means of a pair of nut and bolt assemblies 100, 102 which pass down through support rods 104, 106 in the stanchion.

Figure 8:
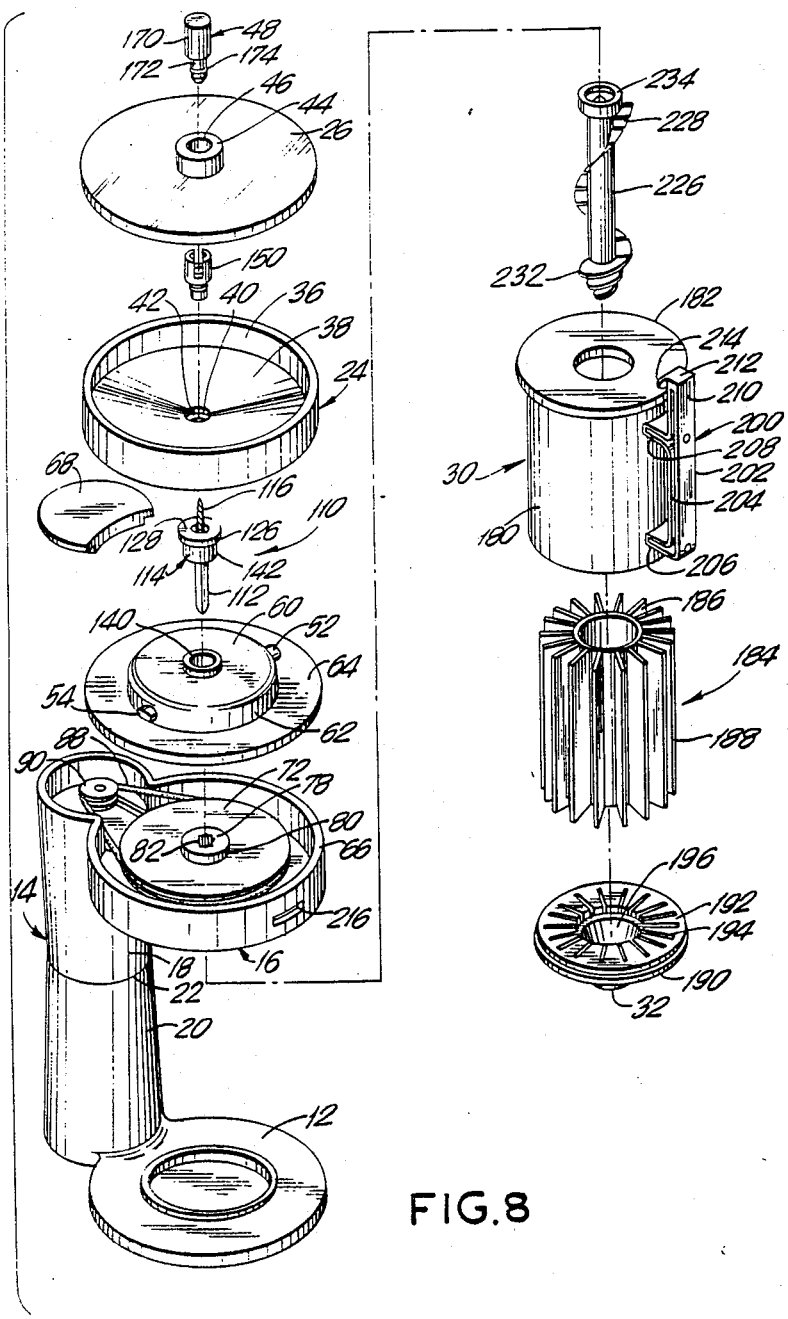
FIG. 8 is a perspective exploded view of the ice cream making machine.

Of significant importance in the present ice cream machine is a drive shaft assembly 110, as shown in FIG. 8, which includes a lower depending driving member 112, and an upper receiving housing 114, which supports an upwardly projecting pull down screw 116. More specifically, as better shown in FIGS. 4 and 11, the drive shaft assembly 110 has its lower portion 112 of substantially square configuration with a tapered lower tip 118. An axial passageway 120 passes through the entire drive member and continues upwardly through a conical funnel type section 122 to communicate with the interior 124 of the upper housing portion 114. The upper housing 114 includes a peripheral wall 126 with a top wall 128 having an aperture 130 therein. A plurality of holes 132 pass from the upper interior 124 down through the conical section 122 and into the lower axial passageway 120. Instead of the holes 132 other types of openings could be used so long as there is a substantially free flow of the liquid. By way of example, FIG. 12A shows a cross opening 132.

The holes 132 are formed in an interior support wall 134 which supports an upwardly projecting screw member 136. The screw member can be in the form of a drill bit, or the like having an exterior spiral left handed threaded surface therein. It should be appreciated, that as the drive shaft assembly is rotated in one direction, because the screw is supported in an upward orientation, rotation of the screw will tend to pull material down from the top of the screw to the bottom of the screw thereby qualifying it as the draw down member heretofore described.

The drive shaft assembly sits into a center hole 140 in the plate 64 at top of the housing. For convenience, a lower collar, 142 is provided at the bottom of the section 114 to snuggly fit into the aperture 140. The square shape at the lower portion 112 of the drive shaft can be received within the hole 82 in the hub 78 of the pulley wheel. By making eight spokes on the hole 82 it facilitates insertion of the square shaft so that it will be easy to seat it in any four out of the eight spokes. It should be appreciated, that once seated within the hub 78 the mating key arrangement between the shaped aperture 82 and the hub 78 of the pulley wheel 72 also having a square shape, locks the drive shaft into place. Accordingly, rotation by means of the belt 88 of the pulley wheel 72 serves to rotate the drive shaft 112 and correspondingly the screw 136.

As shown in FIG. 8, a feed plug 150 is inserted into the aperture 40 in the center of the receptacle 24 and seats into the drive shaft assembly 110. The interconnection can best be noted in FIGS. 4, 5, 6 and 11. The feed plug 150 includes a lower stem 152 which fits into the aperture 130 in the center of the top wall 128 and surrounds a center aperture 154 in which passes the screw 136. Sufficient room is provided around the screw 136 to permit the liquid ingredient to flow. There could also be an arrangement where there is a tight fit and the liquid ingredient will only flow through the side slots.

The upper portion of the feed pug includes an enlarged shoulder 160 which sits onto the seat 42 in the aperture 40 provided in the conical base wall 38 of the receptacle 24. An O-ring 162 provides tight fit of the stem portion 152 into the receptacle opening 40. The upper wall includes a wider aperture therein 164 and includes a pair of opposing slots 166, 168 to facilitate entry of the liquid ingredient therein. The center screw 136 projects upwardly into the upper aperture 164. An interior 0-ring 166 is positioned adjacent the narrowing shoulder section 160.

The plug 48 serving as a stop plug includes an upper cylindrical member 170 with a downwardly extending stem 172 having an O-ring there around 174. The 0-ring actually goes around the third stepped diameter in member 170. The seem 172 fits into the aperture 164 to stop up the feed plug and prevent liquid ingredient from flowing from the receptacle into the feed plug. An interior bore 174 can be provided to ensure that the length of the screw 136 will fit.

Figure 3:
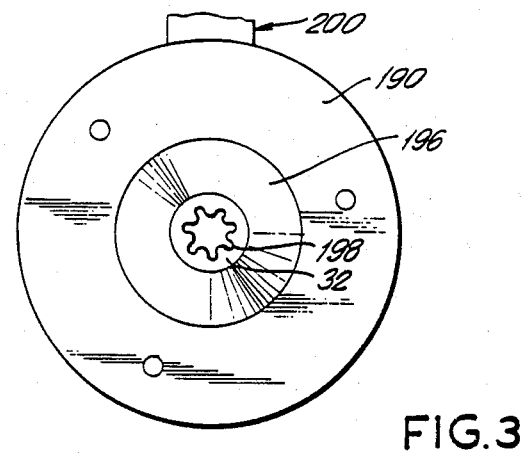
FIG. 3 is a bottom view of the cannister cartridge shown in FIG. 2.

The cannister cartridge comprises a substantially cylindrical outer wall 180 and including a flat top wall 182. Interiorly there is provided a fin assembly 184 having a center interior metal wall 186 with a plurality of radially extending fins 188. The base includes a bottom wall 190 having an upwardly projected pedestal 192 with a plurality of radially extended slots 194 each respectively receiving one of the fins 188 to securely retain it in place. A conical lower end 196 terminates in the lower edge 32 from which is emitted the ice cream. A rippled end 198, as shown in FIG. 3, permits shaping the ice cream into a rippled stream as it is emitted from the cannister cartridge. Three bosses 195 (FIG. 10) are used to interconnect the cannister together.

Surrounding the fins would be placed a suitable liquid such as ethylene glycol and water which can freeze. The cannister cartridge is placed into a refrigerator where the ethylene glycol will suitably freeze at a desired temperature and when an adequate temperature is reached the cartridge can then be reused. It will be noted, that the interior wall 186 of the fin assembly itself serves as the mixing chamber as will hereinafter be described.

Figure 2:
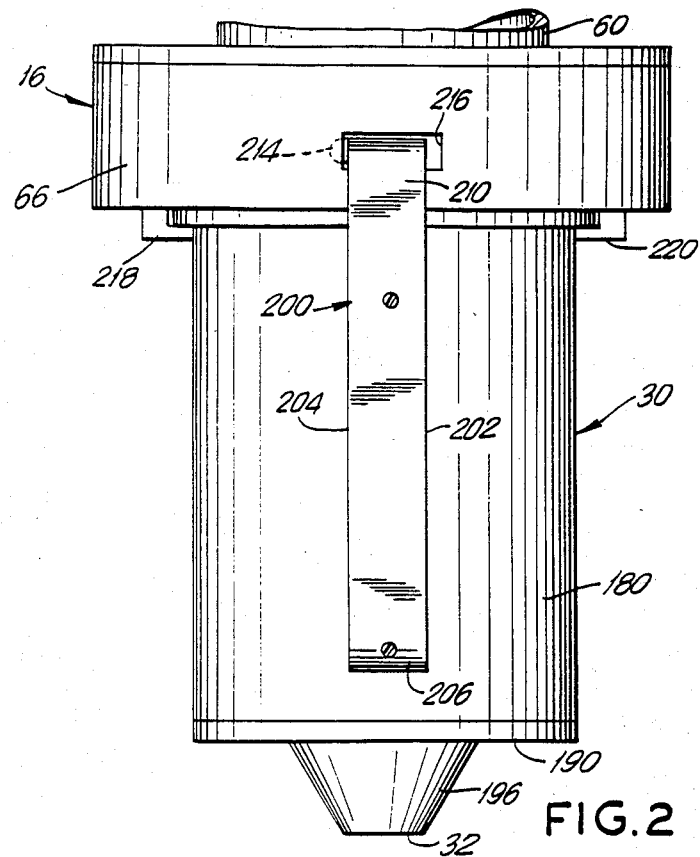
FIG. 2 is a front view of the removable cannister cartridge shown coupled to the head portion of the ice cream machine through a locking arrangement.
Figure 9:
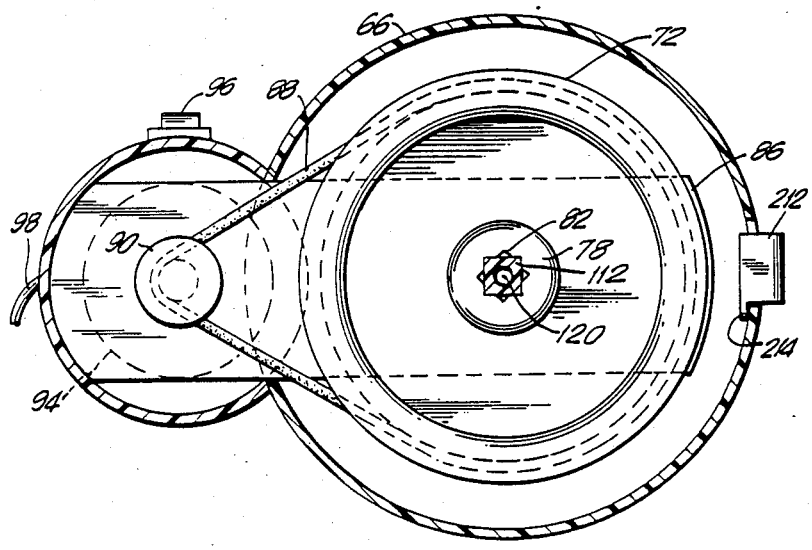
FIG. 9 is a cross-sectional view taken on lines 9—9 of FIG. 4 and showing a pulley arrangement for driving the drive shaft from the motor.

A handle assembly 200 is connected to the exterior of the cannister. The handle assembly includes a vertical section 202, 204 extending at its base into an inwardly directed arm 206 which fits onto the all 180. Likewise at the upper end, the vertical section extends into an arm 208 which is coupled to the wall 180. Upwardly extending from the handle there is included a locking arm 210 which includes an inwardly extending hand 212 and a laterally projecting finger 214. A slot 216 is formed in the wall 66 of the head portion 16. As best seen in FIGS. 2 and 9, the hand 212 fits into the slot 216 and the finger 214 will lock behind the wall surrounding the slot 216. It should be noted, that typically rotation of the rotor within the cartridge will be in a clockwise direction. This will tend to move the entire cartridge toward the left. This movement helps in retaining the finger 214 behind the slot 216 whereby the rotation 8 helps in retaining the cartridge locked in place.

The cannister cartridge is supported by means of a pair of opposing acrurate ledges 218, 220 depending from the underside of the head portion 16.

Within the mixing chamber there is inserted a rotor, generally shown at 224 in FIG. 8. The rotor includes a substantially central shaft 226 with a peripheral blade 228. The blade extends radially outward from the central shaft 226 and spirals around the shaft. The blade is formed of adjacent segments 230 as can best be seen in FIG. 4. At the bottom of the rotor, there is provided a conically tapered screw 232 which fits into the bottom tapered end 32 of the cannister cartridge.

At the upper end of the rotor there is provided a peripheral outer flange portion 234 with a wide mouth aperture therein 236. A central coaxial bore 238 is formed downwardly into the shaft. The bore is shaped to correspondingly receive the drive shaft 112 as can best be seen in FIG. 11. Accordingly, a square aperture 238 forms the bore, as best seen in FIG. 13. A radial outlet port 240 extends through the wall of the shaft from the central bore 238 to the mixing chamber 242 defined within the walls 186 of the fin assembly 184.

Figure 4:
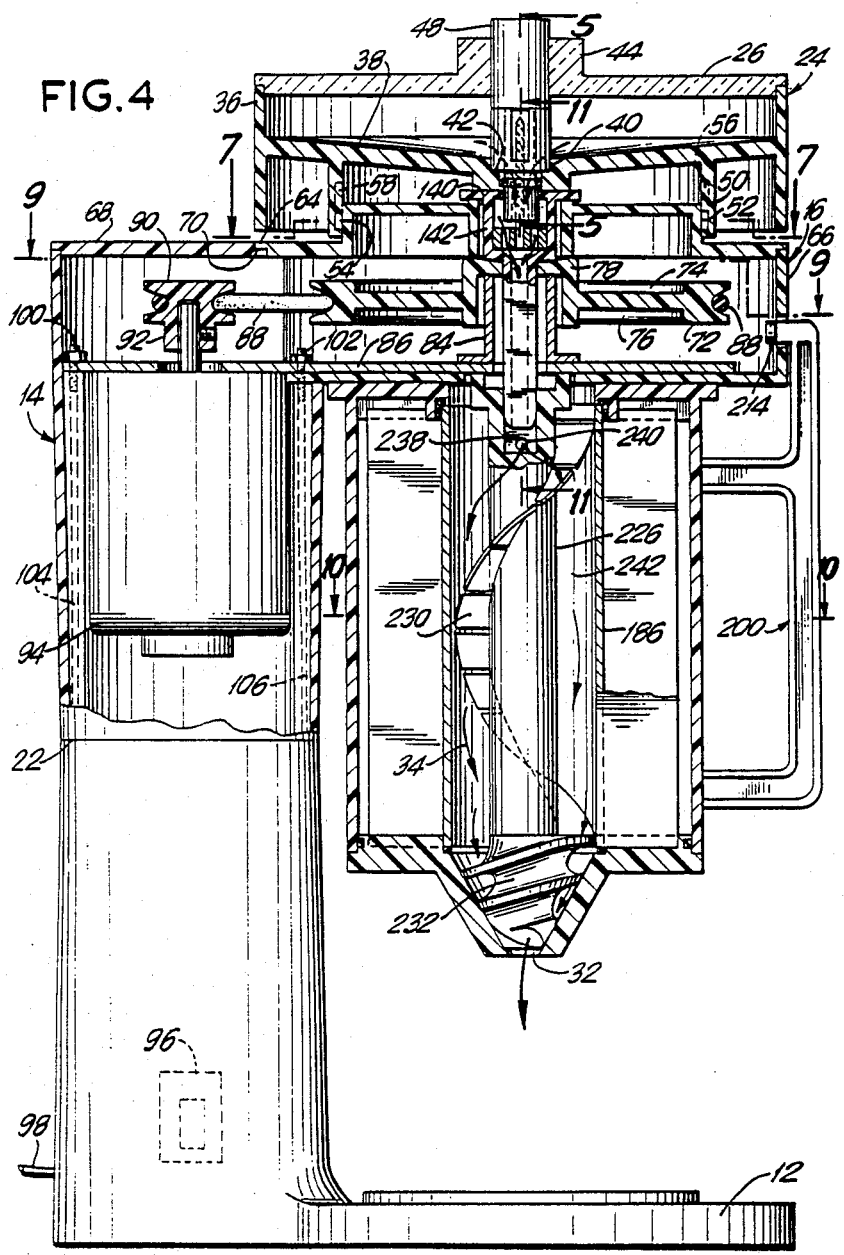
FIG. 4 is a cross-sectional view taken along lines 4—4 of FIG. 1 with the ice cream machine being in an assembled condition.

The feed of the liquid ingredient will now be explained as shown by the arrows provided in FIGS. 4 and 11. The liquid ingredient is placed in the interior of the upper receptacle 24. When the motor is turned on, it causes the drive wheel 72 to rotate thereby rotating the drive shaft 112. This also causes the screw 136 to rotate. As heretofore explained, the rotation of the screw 136 is such as to pull dow any material around it. The liquid ingredient will flow toward the center of the receptacle by means of the conical base wall. It will flow into the feed plug through the opposing apertures in the top part of the feed plug and be pulled down through the center of the feed plug 150 by means of the screw 136. The liquid will then flow into the top housing 114 of the drive shaft assembly and pass through the apertures 132 to feed downwardly into the center axial passageway 120 of the drive shaft and thereby directly feed into the center of the rotor through the bore 238. The liquid ingredients will then be ejected through the radial port 240 in the center rotor shaft to squirt outwardly from the center shaft 226 of the rotor, as best shown in FIG. 4.

Rotation of the rotor causes the blades to atomize the liquid ingredients, and throw it outwardly against the wall 186 of the mixing chamber where it will be frozen. The frozen atomized particles will then be scraped off the walls by the rotating blades and reatomized and continuously whipped and pushed downwardly as the liquid, being whipped and atomized and frozen is fed through the mixing chamber downwardly toward the conical egress at the bottom of the cartridge. The cork screw arrangement at the lower end will then push the liquid ingredients, now in the form of ice cream, out of the cartridge. It has been found that with the present invention, the liquid ingredient is fluffed as it passes through the mixing chamber whereby an improved product is produced.

It has been found that the present invention provides an immediate result within only a minute or so from the time that the liquid ingredients are inserted. Of course, the time will depend upon the thickness and consistency of the liquid ingredient. However, the average time is about a minute. Furthermore, the consistency of the ice cream product is excellent and the taste is smooth with a high quality product being produced. Furthermore, it has been found that the ice cream machine will operate to make ice cream, ices, and the like from simple ingredients such as regular juices, chocolate milk and the like.

One of the basic reasons for the excellent results is the fact that the present invention provides a center feed of the liquid ingredient directly to the center of the rotor through its central post and then ejected outwardly toward the blades. Heretofore, the ingredients were normally injected on the side directly onto the blades and therefore they have fist been met by the blades rather than first ejected outwardly from the central shaft.

The present device also provides for pull down by means of the rotating screw. As a result, various types of consistencies of the liquid ingredients can be used, and still the screw helps to pull down the material. Normally, a thicker type of ingredient would have clogged or may have gotten stuck in the passageway. By means of the screw which helps to pull down the material as it is being rotated, a heaver consistency can be utilized such as apricot juice, pineapple juice, and the like. In fact, it is contemplated that additional ingredients such as raisins, small nuts, and other particles might also be included within the juice ingredients and will be pulled down because of the screw. Such particles will then form an interesting variety to the type of ice cream that can be produced.

Although a particular size of feed plug 150 and stop plug 48 has been shown, as depicted in FIG. 16, for various consistencies a larger feed plug 150' can be used and likewise a larger corresponding plug 48' would be utilized. These would have larger sized central openings permitting larger flow of material therethru.

It should be appreciated, that the drive shaft assembly 110 serves multiple purposes. Firstly, since it is driven by the belt, it serves to drive the rotor. It also serves to feed the rotor with the liquid ingredients which passes directly through the drive shaft and center feeds the rotor. It further serves to lock the rotor in place preventing removal of the cannister since the drive shaft extends downwardly from the head portion and into the cannister. This prevents its removal. Furthermore, since the drive shaft can be easily extracted from the rotor, it permits easy cleaning of the rotor separate from the drive shaft.

It has been found, that rotation of the motor and the drive pulley slightly vibrates the head portion which also aids in the downward flow of the liquid ingredients from the receptacle to the central portion.

Referring now to FIGS. 14 and 15 there is shown an alternate embodiment of a rotor unit 300 having a substantially square central post 302 from which project a plurality of fins 304, each of the fins being attached to one of the sides of the square so as to serve as an extended projection of each of the square sides. The fins are coupled by means of screws 206 to the shaft. The fins could also be molded to the rotor in one piece. Also, the rotor need not be square in outer shape but could have other configurations.

Each fin progresses in sequence about the shaft with one fin being below the other in a progression. Accordingly, fin A projects from one side wit the next fin B being at a layer beneath the fin A and projecting from a side 90° degrees from the first fin. At the next lower layer fin C projects from the next adjacent side and so forth down from the upper end to the lower end of the shaft. At the bottom is provided a tapered cork screw 208 for pushing out the ice cream. In order to help in pushing the ice cream downward, each of the fins can be inwardly angled.

At the upper end, a bore 210 is axially formed partway through the center of the shaft to receive the correspondingly shaped square portion of the drive shaft 112. At least one radial outlet 212 is provided from the center bore 210 to the out side of the shaft. It should be noted that both in this embodiment and in the first embodiment, the drive shaft and the corresponding bore in the rotor need not be square but could have other mating and locking configurations.

As before, the liquid ingredient is fed to the center of the post of the rotor by means of the drive shaft. The fluid then is fed into the center axial square bore in the post and from there is ejected outwardly through the outlet 212. The liquid ingredient will then shoot to the interior wall of the mixing chamber and then be driven by the fins 204 to be atomized, mixed, whipped, and thrown against the freezing walls and finally driven downwardly through the mixing chamber to be ejected by the cork screw 208. The ingredients are fluffed to produce a high quality product.

Figure 10:
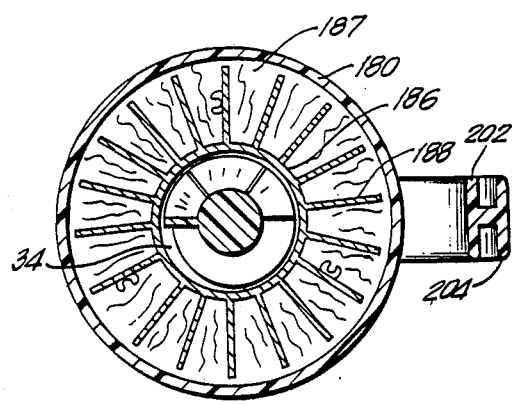
FIG. 10 is a cross-sectional view taken along lines 10—10 and showing the cannister cartridge interior.

It should be appreciated from the drawings, and specifically FIGS. 4 and 10, the blades of the rotor or the fins of a rotor of the type of FIG. 14 are such that they scrape tightly against the interior wall of the mixing chamber. In fact, it is preferable if they are slightly larger so that there is some prestressing of the blades as they scrape along the interior wall of the mixing chamber.

There has been disclosed heretofore the best embodiment of the invention presently contemplated. However, it is to be understood that various changes and modifications may be made thereto without departing from the spirit of the invention.

What is claimed is:

1. A machine for making ice cream and the like, comprising;
   a receptacle for receiving liquid ingredients to be used for making the ice cream;
   a mixing chamber having an egress from which the ice cream exits;
   a cooling chamber surrounding said mixing chamber;
   a rotor centrally mounted in said mixing chamber for atomizing and mixing the liquid ingredients and moving it through the mixing chamber to its egress, said rotor having a central post and outwardly projecting blade means;
   conduit means for feeding the liquid ingredients from the receptacle to the central post of the rotor;
   outlet port means on said central post through which the liquid ingredients are ejected outwardly from the central post for action by the blade means, and wherein said central post has a bore extending at least partially therein, at least one aperture extending from said bore to the exterior of said shaft, and wherein said conduit means comprises a drive shaft received with in said bore for rotating said central post.

2. A machine for making ice cream and the like as in claim 1, wherein said drive shaft and said bore are matingly keyed whereby said drive shaft rotatingly drives said rotor.

3. A machine for making ice cream and the like as in claim 1, wherein said drive shaft has an axial passageway therethru for feeding the liquid ingredients from said receptacle to said bore.

4. A machine for making ice cream and the like as in claim 2, comprising removable cooling unit including said cooling chamber and said mixing chamber, a housing for retaining said receptacle and said removable cooling unit and wherein said drive shaft locks the cooling unit to the housing.

5. A machine for making ice cream and the like as in claim 2, and further comprising a pulley wheel coaxially mounted with the drive shaft, a diving means for rotating said pulley wheel, and wherein said pulley wheel and said drive shaft are matingly keyed whereby said pulley rotatably operates said drive shaft.

6. A machine for making ice cream and the like as in claim 5, and further comprising motor means mounted adjacent said pulley wheel and having an output shaft, a drive wheel on said output shaft, and belt means coupling said drive wheel and said pulley wheel.

7. A machine for making ice cream and the like as in claim 2, wherein said drive shaft has a substantially square cross sectional configuration and said bore has a matingly shaped configuration.

8. A machine for making ice cream and the like as in claim 5, wherein said drive shaft has a substantially square cross sectional configuration, and said pulley wheel has a matingly shaped axial opening to receive said drive shaft.

9. A machine for making ice cream and the like as in claim 8, wherein said axial opening is octagonal in shape to facilitate insertion of said drive shaft there through.

10. A machine for making ice cream and the like as in claim 1, wherein said drive shaft is removable from said bore for cleaning.

11. A machine for making ice cream and the like as in claim 1, comprising a threaded pin rotatingly supported by said drive shaft for rotation in a reverse threaded direction, and projecting into said receptacle for pulling down the liquid ingredients from the receptacle into the mixing chamber.

12. A machine for making ice cream and the like comprising:
    a housing;
    a receptacle for receiving liquid ingredients to be used for making the ice cream;
    a mixing chamber having an inlet for receiving the liquid ingredients and an outlet for ejecting the ice cream;
    a rotor in said mixing chamber operatively rotatable for mixing the ingredients and moving it through the mixing chamber from its inlet to its outlet;
    an elongated passageway extending from the receptacle to the mixing chamber;
    draw thru means for mechanically pulling down the liquid ingredients through said passageway to the mixing chamber, to aid in the continuous flow of the liquid into the mixing chamber, and wherein said draw through means comprises a threaded post coaxially located in said passageway, and means for rotatingly driving said post in a reverse threading direction.

13. A machine for making ice cream and the like as in claim 12, wherein said threaded post projects into said receptacle, and further comprising a feed plug insertable from said receptacle at least part way into said passageway, and having a central bore coaxially surrounding the projecting threaded post.

14. A machine for making ice cream and the like as in claim 13, wherein said feed plug has opposing slots therein for aiding entry of the liquid ingredients into the passageway.

15. A machine for making ice cream and the like as in claim 13, and further comprising a stop plug removably insertable into said feed plug for blocking the flow of liquid from said receptacle through said feed plug.

16. A machine for making ice cream and the like as in claim 13, and comprising a plurality of interchangeable feed plugs, each interchangeably insertable from the receptacle, and each having a different sized central bore, whereby different consistencies of liquid ingredients can thereby be accommodated.

17. A machine for making ice cream and the like as in claim 14, and wherein said receptacle comprises a funnel shaped base wall feeding down towards same passageway to help guide the liquid ingredients through said passageway.

18. A machine for making ice cream and the like as in claim 12, and further comprising an elongated drive shaft extending between said receptacle and said mixing chamber, said passageway being axially formed through said drive shaft, an upper end in said drive shaft supporting said threaded post, a lower end o said drive shaft coupled to said rotor, and further comprising drive means for rotatingly operating said drive shaft to hereby rotate both said rotor and said threaded post.

19. An ice cream making machine comprising a base, a stanchion upstanding from the base, and a head portion supported on the stanchion, a central axial passageway through said head portion, a receptacle for receiving liquid ingredients and removably securable onto said head portion, said receptacle having an outlet aligned with said central axial passageway, a removable portable cooling cannister dependingly secured to an underside of said head portion, a mixing chamber in said cooling cartridge coaxially aligned with said passageway, a rotor removably inserted into said mixing chamber, and drive means in said stanchion for rotatingly driving said rotor means, and further comprising a drive shaft removably received in said passageway for rotatingly driving said rotor and having a central coaxial channel therethru, said liquid ingredients flowing through said channel from said receptacle to the mixing chamber.

20. An ice cream making machine as in claim 21, wherein said cartridge comprises an upwardly extending locking arm, a recess in said head portion for receiving at least a portion of the locking arm, add a locking finger extending from said locking arm in the direction of rotation of the rotor, whereby rotation of the rotor aids in maintaining the cartridge in a locked position.

21. An ice cream making machine as in claim 19, wherein said rotor comprises a central post, and a radially outwardly projecting blade spirally configured about said post.

22. An ice cream making machine as in claim 21, wherein said blade is segmented along its spiral path.

23. An ice cream making machine as in claim 21, and comprising a tapered screw at the distal end of said post.

24. An ice cream making machine as in claim 19, wherein said rotor comprises a central post, a sequence of fins projecting from said post in orthogonal arranged sequence, successive fins being arranged in sequential layers one beneath the other.

25. An ice cream making machine as in claim 24, wherein said central post is substantially square, and wherein said fins respectively extend from a side of said central post.

26. An ice cream making machine as in claim 21, and wherein said rotor comprises a central post, a bore coaxially extending therein from an upper edge thereof, an aperture from said bore to the exterior of said post, said drive shaft being received in said bore for driving said rotor, for central feeding the liquid ingredients thereto, and for locking said cannister to the head portion.

27. An ice cream making machine as in claim 21, and comprising a central pulley positioned in said head portion, a central aperture formed therein, said drive shaft passing through said central aperture, and belt means from said drive means to said central pulley.

28. An ice cream machine, comprising a housing, a storage compartment on said housing for retaining liquid ingredients to be used for making ice cream;
  a portable removable cartridge having an annular cooling compartment defined by interior and exterior walls, the interior wall forming the outer wall of a mixing chamber, said mixing chamber receiving the liquid ingredients directly therein from the storage compartment;
  motor driven rotor means including a plurality of blades rotatably driven within said mixing chamber and effective to atomize the liquid ingredients and move it downward through the mixing chamber;
  cooling means in said cooling compartment for cooling the mixing chamber;
  outlet means for extracting the ice cream from the mixing chamber, and coupling means for releasably coupling said cartridge from said housing, said coupling means comprising means for aiding the securement of the cartridge to the housing through rotation of the rotor means.

* * * * *

UNITED STATES PATENT AND TRADEMARK OFFICE
CERTIFICATE OF CORRECTION

PATENT NO. : 4,910,973

DATED : March 27, 1990

INVENTOR(S) : HAROLD OSROW and ZVI BLEIER

It is certified that error appears in the above-identified patent and that said Letters Patent is hereby corrected as shown below:

Title page: line [73], the line should read as follows:

[73[ Assignee: Creative Technologies Corporation
Deer Park, New York

Signed and Sealed this

Fifth Day of March, 1991

*Attest:*

HARRY F. MANBECK, JR.

*Attesting Officer*     *Commissioner of Patents and Trademarks*